(12) United States Patent
Rozitis et al.

(10) Patent No.: US 8,363,317 B2
(45) Date of Patent: Jan. 29, 2013

(54) METHOD AND APPARATUS FOR FOCUSING A MICROSCOPE

(75) Inventors: Peter A. Rozitis, Midland (CA); Kevin B. Wagner, Wyevale (CA)

(73) Assignee: Raytheon Canada Limited (CA)

( * ) Notice: Subject to any disclaimer, the term of this patent is extended or adjusted under 35 U.S.C. 154(b) by 752 days.

(21) Appl. No.: 12/490,082

(22) Filed: Jun. 23, 2009

(65) Prior Publication Data

US 2010/0321771 A1 Dec. 23, 2010

(51) Int. Cl.
*G02B 21/00* (2006.01)
(52) U.S. Cl. .......................... 359/383; 359/382
(58) Field of Classification Search ........................ None
See application file for complete search history.

(56) References Cited

U.S. PATENT DOCUMENTS

| | | | | |
|---|---|---|---|---|
| 3,623,790 A | * | 11/1971 | Buckstad et al. | 359/801 |
| 4,660,942 A | * | 4/1987 | Hill | 359/383 |
| 7,852,551 B2 | * | 12/2010 | Hara et al. | 359/368 |
| 2005/0099681 A1 | * | 5/2005 | Kanao | 359/383 |
| 2006/0011001 A1 | * | 1/2006 | Showalter | 74/23 |
| 2010/0033835 A1 | * | 2/2010 | Heim et al. | 359/683 |

FOREIGN PATENT DOCUMENTS

WO WO 2006/133899 A2 12/2006

OTHER PUBLICATIONS

Marketing brochure, "Colibri—Highlights for Fluorescence Microscopy", Carl Zeiss Microimaging GmbH, Göttingen, Germany, May 2007, 12 pages.

* cited by examiner

*Primary Examiner* — Lee Fineman
(74) *Attorney, Agent, or Firm* — Lando & Anastasi, LLP

(57) ABSTRACT

A microscope includes a member supported for movement relative to a base along a path of travel, and optics on the member for imaging a region that includes a location for a specimen. The method and apparatus involve: effecting relative movement of a cam operatively coupled to one of the member and the base with respect to a cam follower operatively coupled to the other of the member and the base in a manner so that the cam follower slides along a cam surface on the cam; and responding to the sliding movement of the cam follower along the cam surface by effecting relative movement of the cam and cam follower in a manner that in turn effects movement of the member along the path of travel relative to the base.

15 Claims, 12 Drawing Sheets

METHOD AND APPARATUS FOR FOCUSING A MICROSCOPE

FIELD OF THE INVENTION

This invention relates in general to microscopes and, more particularly, to techniques for focusing a microscope.

BACKGROUND

In a microscope used for fluorescence microscopy, the focusing optics do not need to be moved a large distance in order to achieve the necessary degree of focus. Instead, only a small amount of movement is needed, but it is desirable that this movement be carried with a very high degree of accuracy, for example in small increments on the order of about 10 microns. Although existing microscopes have provided an adequate degree of accuracy in focus, this accuracy has not been entirely satisfactory. This is due in part to the fact that existing focus drives tend to have a degree of backlash that reduces the accuracy of the focus.

A further consideration is that, in fluorescence microscopy, light emitting diode (LED) devices are used as light sources. Sometimes it is necessary to change a light source, for example to replace an LED that has failed, or to change the color (wavelength) of the illumination. In order to change a light source, it is typically necessary to carry out a significant degree of disassembly of the microscope in order to reach the light source. Moreover, where the replacement is being carried out in order to adjust the wavelength of the illumination, it may also be necessary to adjust the focal length, and/or change some optical components such as lenses and/or filters. This can involve replacing several independent components. As a result, the overall procedure, while adequate for its intended purposes, tends to be time consuming, and can involve replacement of multiple components on an item-by-item basis.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
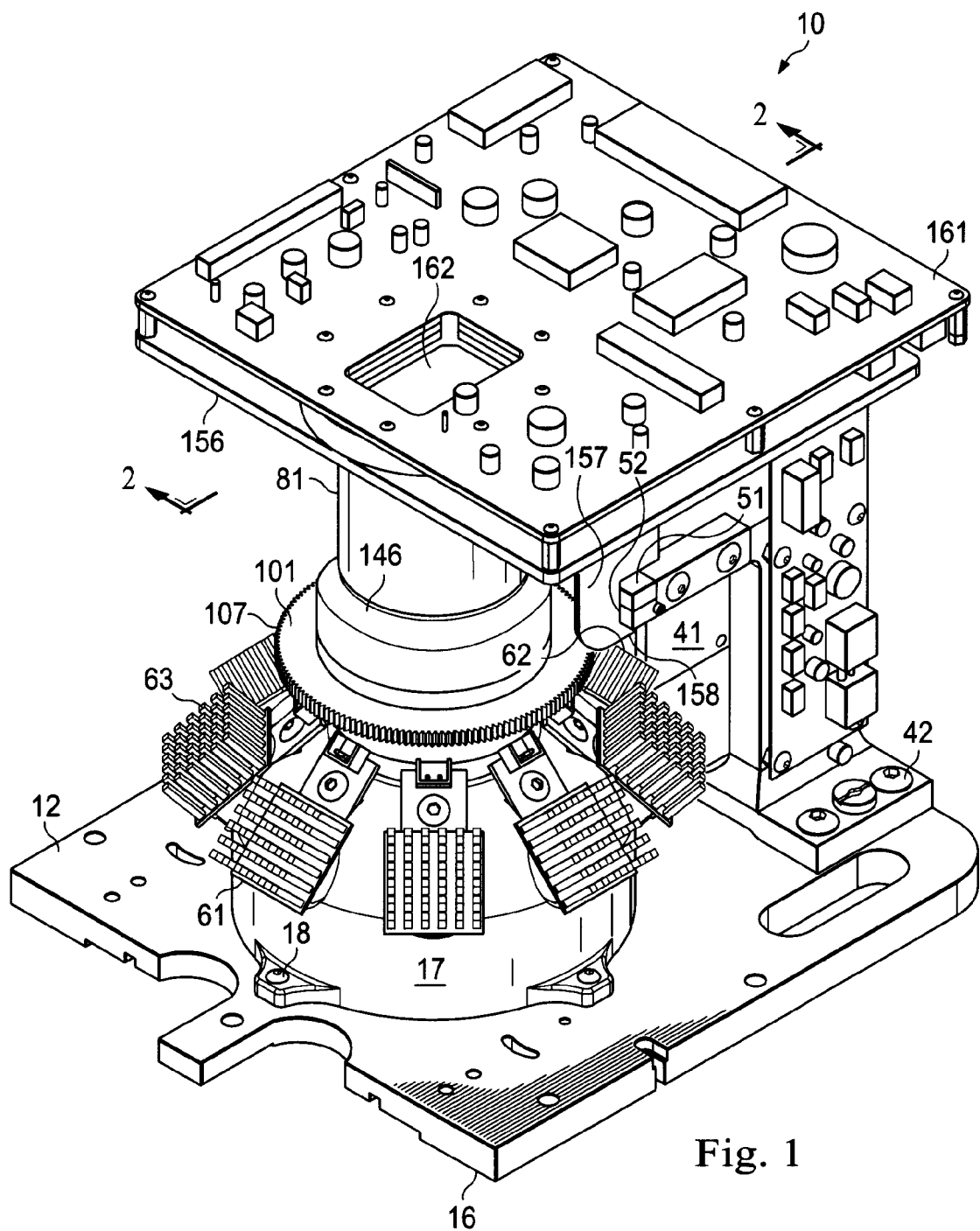
FIG. 1 is a diagrammatic perspective view of a microscope that embodies aspects of the invention.
Figure 2:
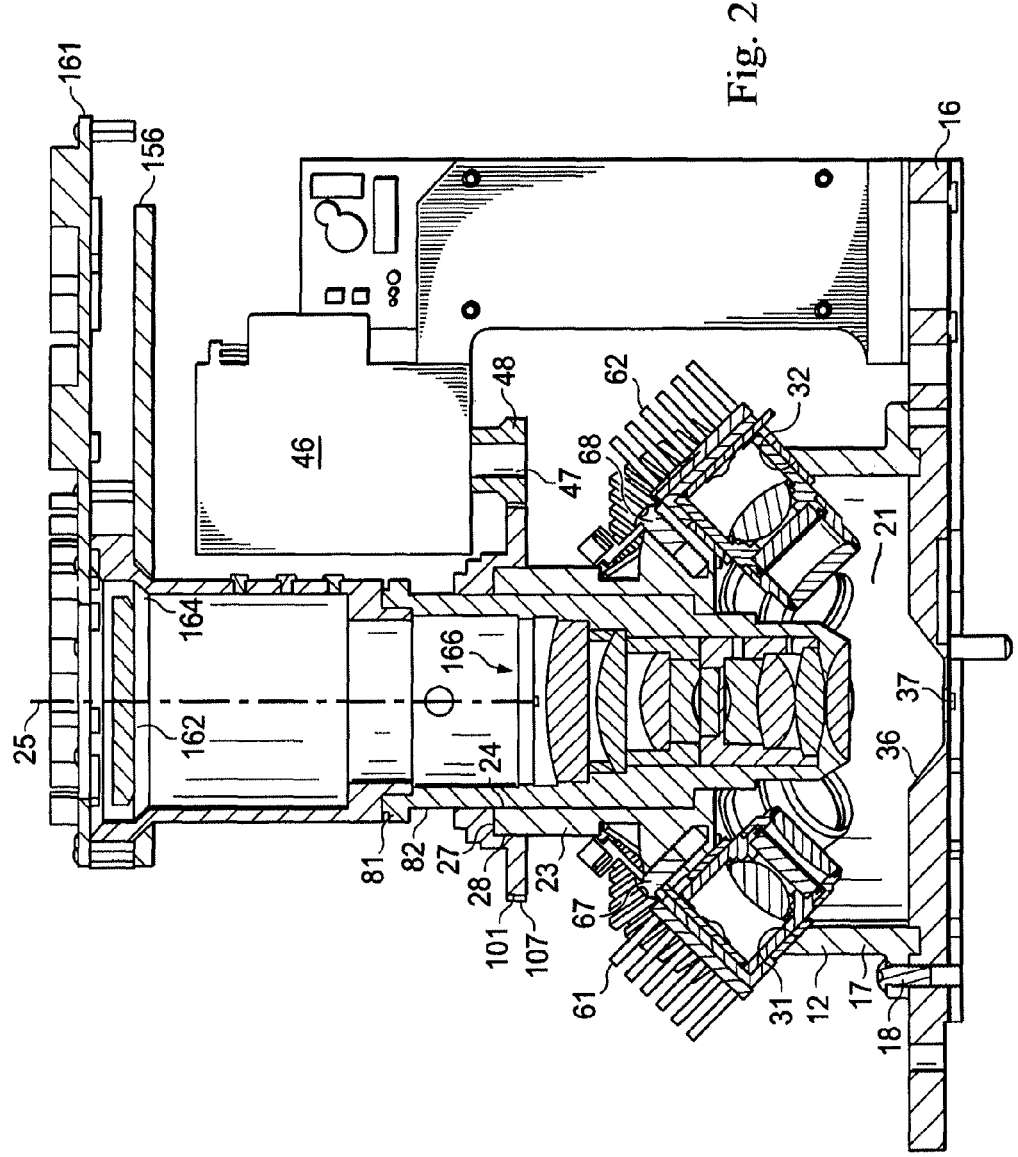
FIG. 2 is a diagrammatic sectional side view, taken along the section line 2-2 in FIG. 1.

FIG. 1 is a diagrammatic perspective view of a microscope 10 that embodies aspects of the invention. For simplicity and clarity, an outer housing of the microscope 10 has been omitted in the drawings. The microscope 10 is used for fluorescence analysis, but could alternatively be used for some other purpose. FIG. 2 is a diagrammatic sectional side view of the microscope 10, taken along the section line 2-2 in FIG. 1.

The microscope 10 has an aluminum base 12 that includes a lower part 16 in a form of a base plate, and an upper part 17 in the form of a shell. The shell 17 is fixedly secured to the base plate 16 by a plurality of screws 18. As best seen in FIG. 2, the base 12 has a chamber 21 therein, defined by a downwardly open recess in the shell 17. The upper portion of the shell 17 includes a vertically upwardly extending projection 23 having a cylindrical outer surface that is concentric to a vertical axis 25. A cylindrical opening 24 extends vertically through the projection 23. The cylindrical opening 24 is concentric to the vertical axis 25, has a lower end that opens into the chamber 21, and has an upper end that opens through a top surface 27 of the shell 17. The top surface 27 is an axially upwardly facing annular bearing surface. A radially outwardly facing annular bearing surface 28 is provided adjacent the upper end of the projection 23. The bearing surfaces 27 and 28 are each concentric to the vertical axis 25.

The shell 17 has eight uniformly circumferentially spaced cylindrical openings that extend therethrough from the chamber 21 to the outer surface of the shell at an angle of approximately 45° with respect to the vertical axis 25. Two of these openings are visible in FIG. 2, and are respectively designated by reference numerals 31 and 32.

The base plate 16 has a downwardly converging frusto-conical opening 36 therethrough. The opening 36 is concentric to the vertical axis 25. At its upper end, the opening 36 communicates with the chamber 21. A conventional and not-illustrated specimen support can be removably secured against an underside of the base plate 16, in order to support a specimen at a location 37 that is identified in FIG. 2 by a small rectangle.

Figure 3:
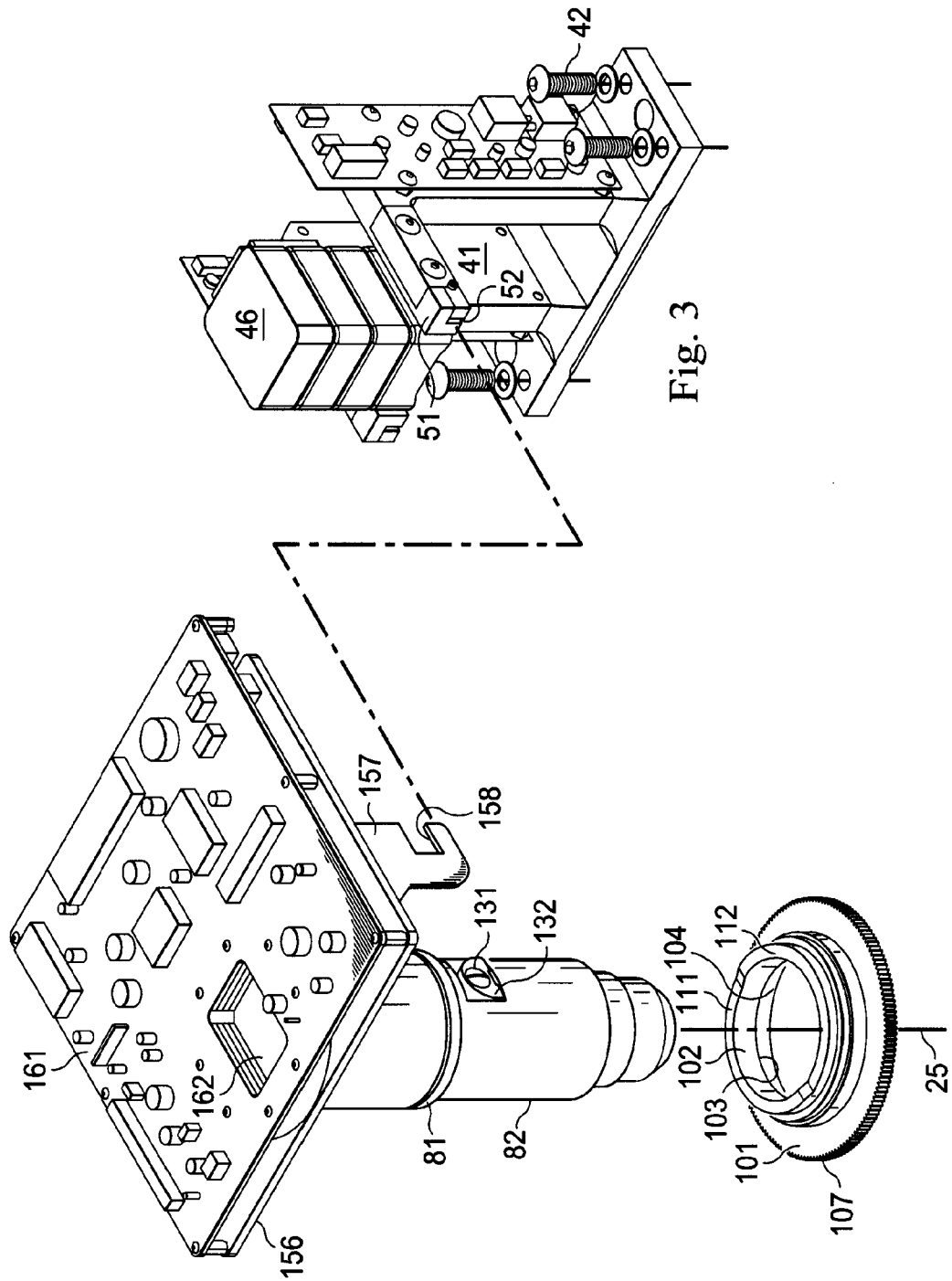
FIG. 3 is a diagrammatic perspective exploded view showing selected components from the microscope of FIGS. 1 and 2.

FIG. 3 is a diagrammatic perspective exploded view showing selected components from the microscope 10 of FIGS. 1 and 2. With reference to FIGS. 1 through 3, an aluminum support column 41 has its lower end fixedly secured to the base plate 16 by several screws 42, and extends vertically upwardly from the base plate. As shown in FIGS. 2 and 3, an electric motor 46 is fixedly secured to an upper portion of the support column 41, with an orientation so that a rotatable shaft 47 of the motor protects vertically downwardly from the motor. In the disclosed embodiment, the motor 46 is a stepper motor, but it could alternatively be any other suitable type of motor. A pinion gear 48 is fixedly secured to the lower end of the shaft 47, for a purpose discussed later. An anti-rotation section 51 is also fixedly secured to the upper portion of the support column 41, and has a vertically extending slot 52 therein for a purpose discussed later.

With reference to FIGS. 1 and 2, the microscope 10 has eight illumination modules, three of which are designated by respective reference numerals 61, 62 and 63. AS discussed above, the shell has eight circumferentially-spaced openings therethrough, two of which are identified by reference numerals 31 and 32. Each of these eight openings has fixedly but removably installed therein a respective one of the eight illumination modules, including the three illumination modules identified by reference numerals 61, 62 and 63. The eight illumination modules are each held in place by a single removable screw, for example as shown in 67 and 68 in FIG. 2 for the illumination modules 61 and 62. Each of the eight illumination modules can emit radiation that illuminates a not-illustrated specimen disposed at the location 37. In the microscope 10, the eight illumination modules are all different from each other. For example, the illumination modules each emit radiation having respective distinct characteristics, and typically no more than one of the eight illumination modules is energized at any given point in time. The structure and operation of the illumination modules is discussed in more detail later.

As shown in FIGS. 2 and 3, the microscope 10 includes a tubular barrel member 81 that is made of aluminum and that extends vertically through the cylindrical opening 24 in the projection 23 of the shell 17. The barrel member 81 has a cylindrical outer surface 82 that is concentric to the vertical axis 25, and that has a diameter slightly less than the inside diameter of the cylindrical opening 24. The cylindrical surface 82 slidably engages the cylindrical inner surface of the opening 24, so that the barrel member 81 is capable of reciprocal vertical sliding movement relative to the shell 17.

Figure 4:
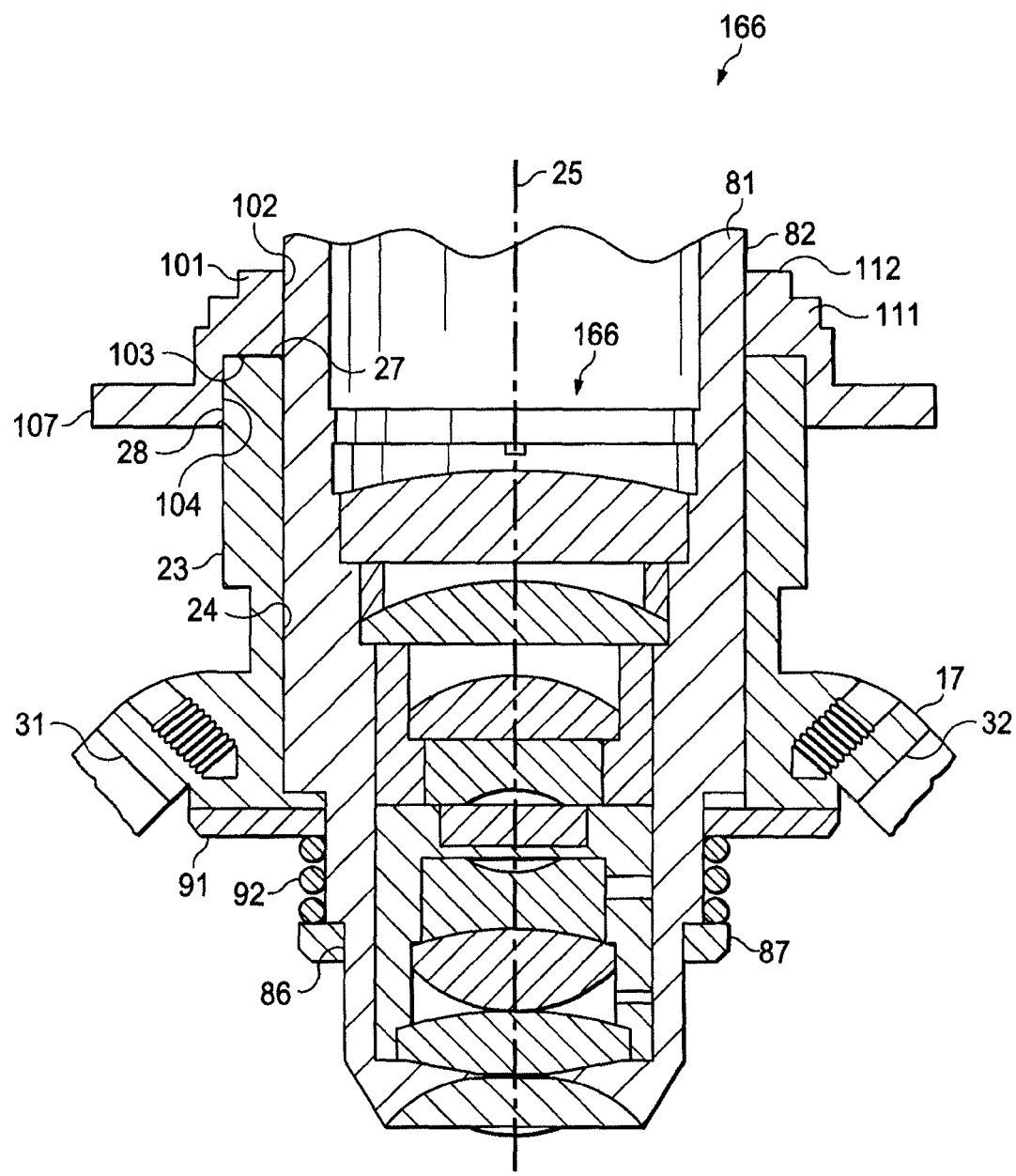
FIG. 4 is a diagrammatic fragmentary sectional side view that shows, in an enlarged scale, a portion of the structure of FIG. 2.

FIG. 4 is a diagrammatic fragmentary sectional side view that shows, in an enlarged scale, a portion of the structure of FIG. 2, including a lower portion of the barrel member 81, and some surrounding structure. As shown in FIG. 4, the barrel member 81 has an annular recess 86 near a lower end thereof. A retaining ring 87 is fixedly engaged in the annular recess 86 with a snap fit. A flat washer 91 encircles the barrel member 81 above the retaining ring 87, and has an upper surface that is disposed against a top surface of the chamber 21 in the shell 17. A resilient helical compression spring 92 encircles the barrel member 81 between the retaining ring 87 and the washer 91, and yieldably urges the retaining ring 87 away from the washer 91. This in turn causes the barrel member 81 to be urged downwardly in relation to the shell 17.

As best seen in FIGS. 2, 3 and 4, an annular gear 101 encircles the barrel member 81. In the disclosed embodiment, the gear 101 is made of aluminum, but it could alternatively be made of any other suitable material. The gear 101 has a radially inwardly facing cylindrical bearing surface 102 that slidably engages the cylindrical surface 82 on the barrel member 81, an annular axially-facing bearing surface 103 that slidably engages the bearing surface 27 on the shell 17, and a radially-inwardly facing annular bearing surface 104 that slidably engages the bearing surface 28 on the shell. As a result of the sliding engagement of these pairs of bearing surfaces, the annular gear 101 can rotate relative to the shell 17 and the barrel member 81. A lubricant is provided between these pairs of bearing surfaces. The lubricant used in the disclosed embodiment is available commercially as BRAY-COTE® 601 EF from Castrol Industrial North America, Inc. of Naperville, Ill. Alternatively, however, any other suitable lubricant could be used, or for some applications the lubricant could be omitted.

The annular gear 101 has a plurality of gear teeth 107 extending around the periphery thereof. As shown in FIG. 2, the gear teeth 107 on the gear 101 engage the gear teeth on the pinion gear 48. Thus, when the motor 46 rotates the gear 48, the gear 48 in turn rotates the gear 101.

Figure 5:
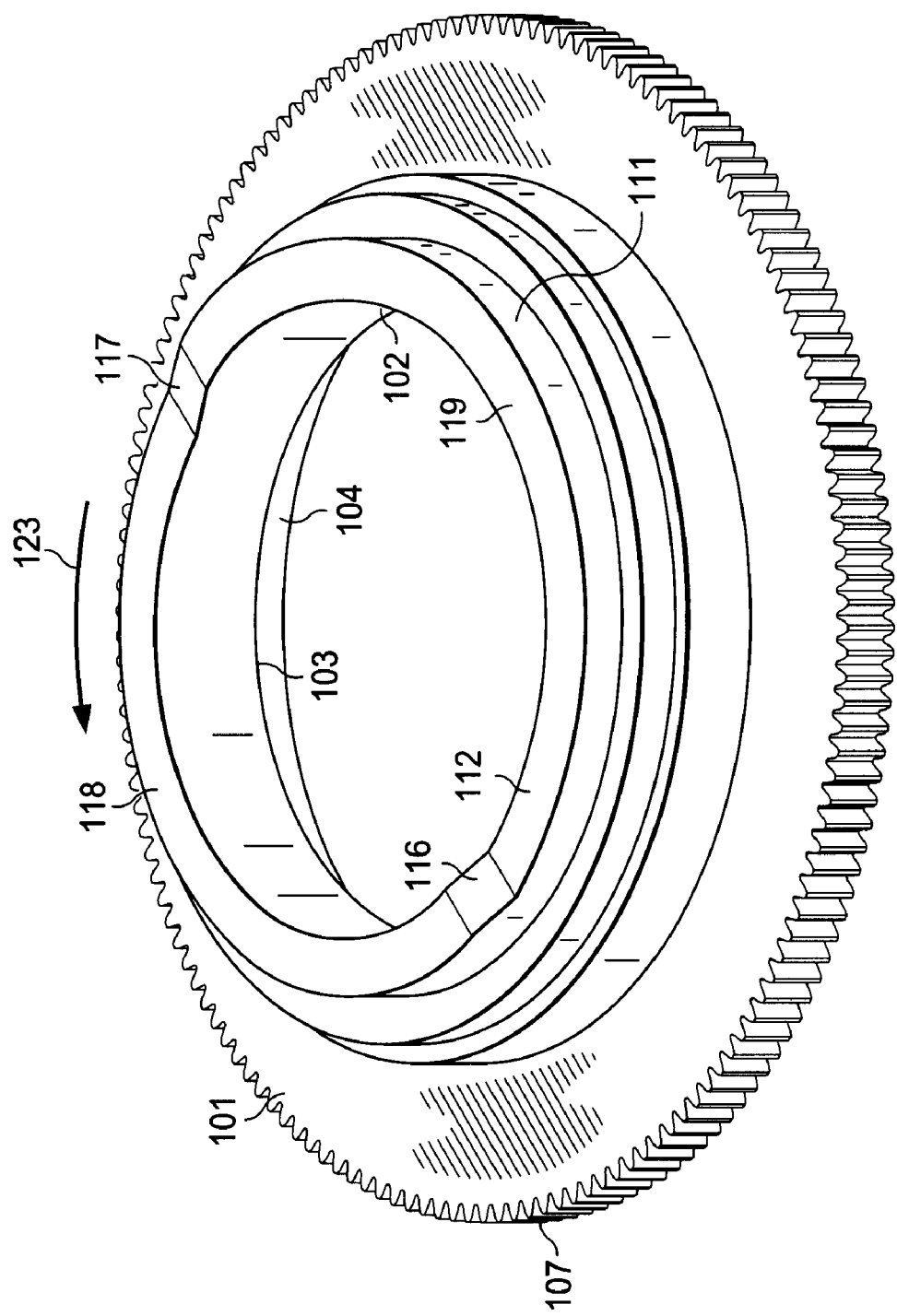
FIGS. 5 and 6 are respectively a diagrammatic perspective view and a diagrammatic top view that show, in an enlarged scale, a gear that is a component of the microscope of FIG. 1.
Figure 6:
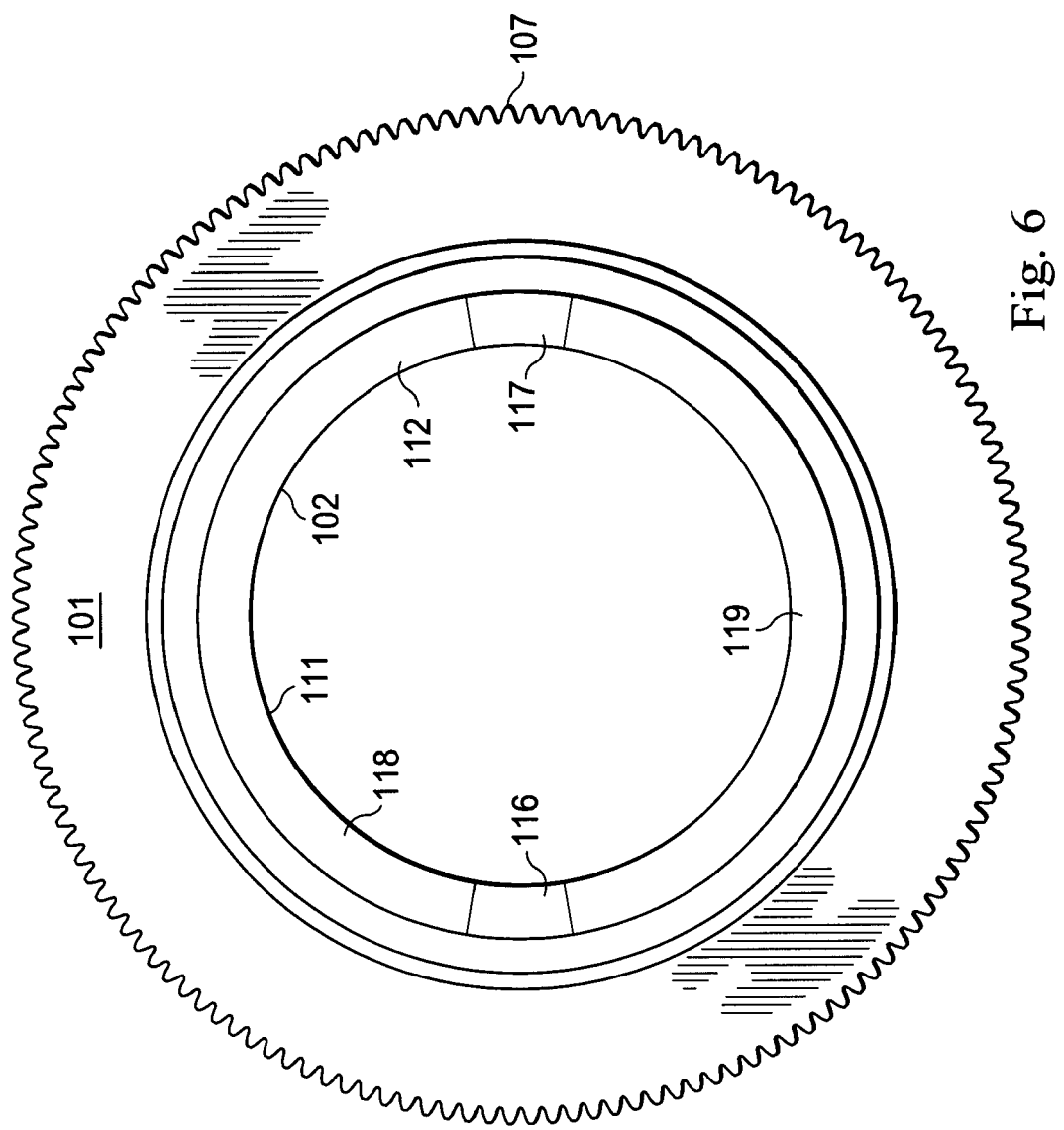

FIGS. 5 and 6 are respectively a diagrammatic perspective view and a diagrammatic top view of the gear 101, showing the gear in an enlarged scale. With reference to FIGS. 4, 5, and 6, the upper portion of the gear 101 serves as an annular cam 111 that extends completely around the barrel member 81. The cam 111 has thereon an upwardly-facing annular cam surface 112 that extends completely around the barrel member 81. As best seen in FIGS. 5 and 6, the cam surface 112 has two short transition surface portions 116 and 117 at diametrically opposed locations, and has longer cam surface portions 118 and 119 disposed between the transition surface portions 116 and 117. In a counterclockwise direction 123, as viewed in FIG. 5, the cam surface portion 118 progressively rises with a gradual slope from the transition surface portion 117 to the transition surface portion 116, the transition surface portion 116 then progressively drops with a significantly greater slope, the cam surface portion 119 then progressively rises with a gradual slope from the transition surface portion 116 to the transition surface portion 117, and then the transition surface portion 117 progressively drops with a significantly greater slope.

Figure 7:
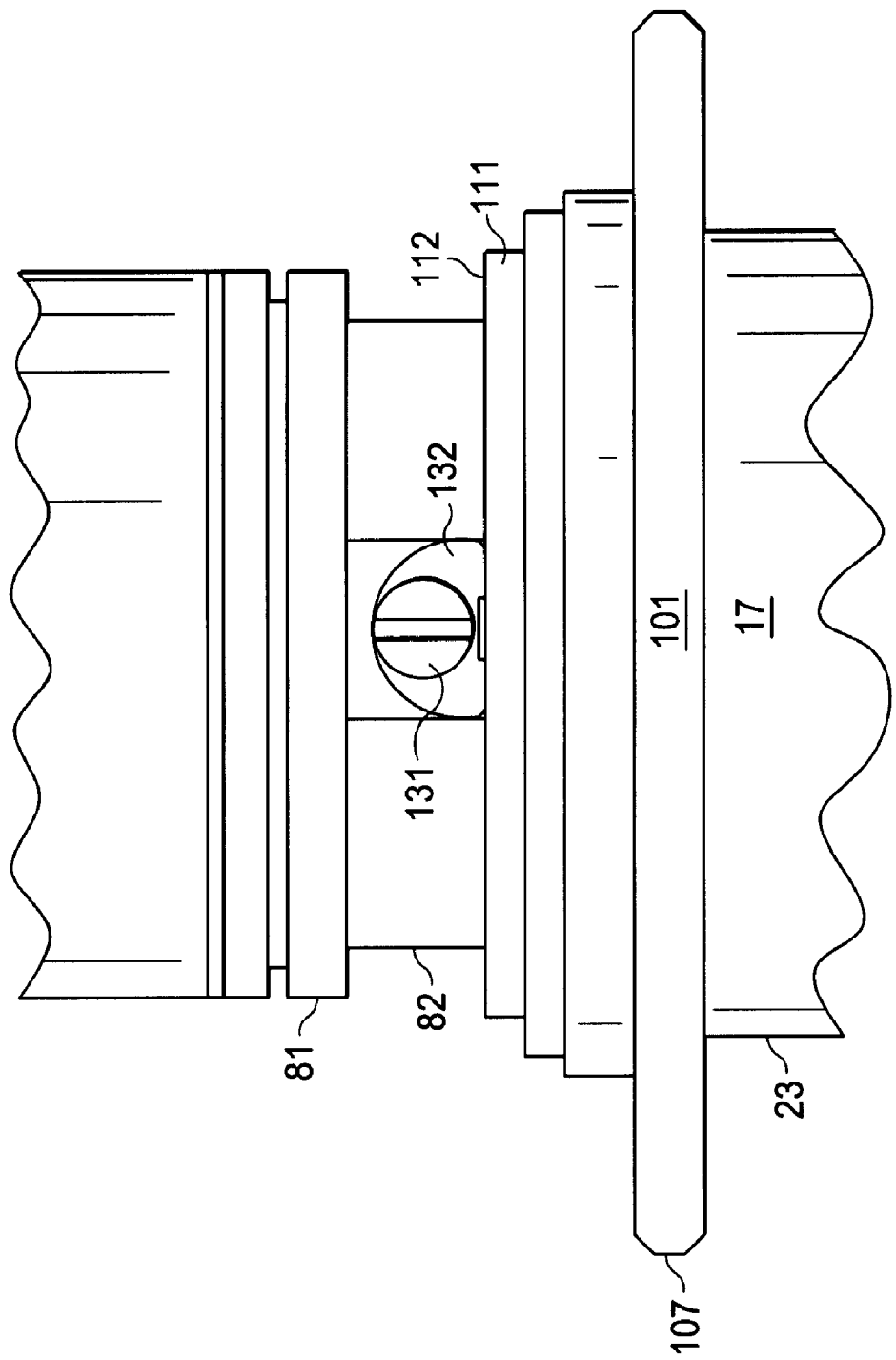
FIG. 7 is a diagrammatic fragmentary side view of the gear of FIGS. 5 and 6, and adjacent portions of other components of the microscope of FIG. 1.

FIG. 7 is a diagrammatic fragmentary side view of the gear 101, and adjacent portions of the barrel member 81 and shell 17. With reference to FIGS. 3 and 7, two screws 131 are disposed on diametrically opposite sides of the barrel member 81. The screws 131 each extend radially with respect to the vertical axis 25, and each engage a respect threaded radial opening provided in the barrel member 81. Two identical cam follower parts 132 are provided, and each is pivotally supported on a respective one of the two screws 131. The cam follower parts 132 each slidably engage the cam surface 112 on the gear 101. In the disclosed embodiment, the cam follower parts 132 are each made of nylon. However, they could alternatively be made of any other suitable material.

Figure 8:
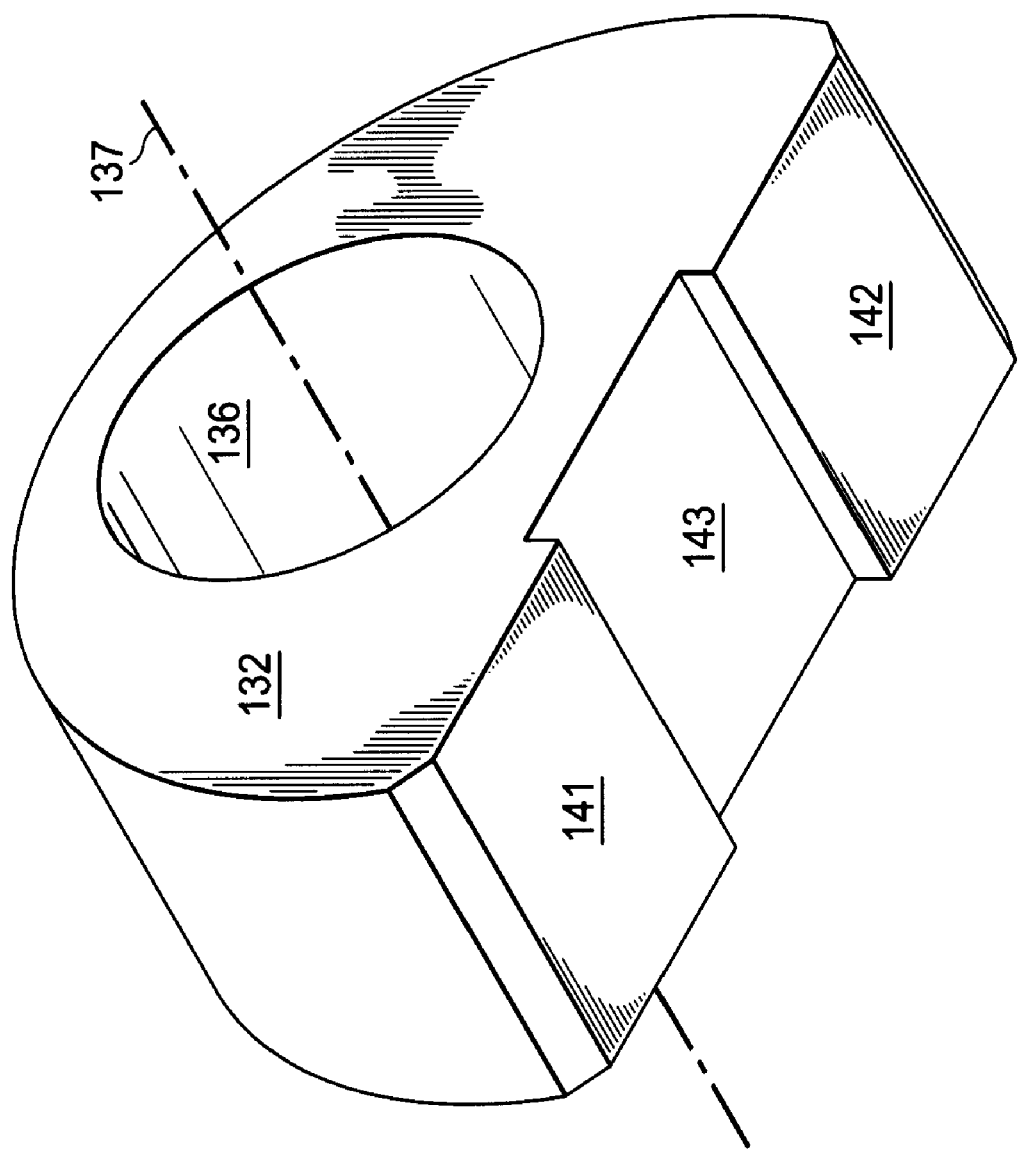
FIG. 8 is a diagrammatic perspective view of one of two identical cam follower parts that are components of the microscope of FIG. 1.

FIG. 8 is a diagrammatic perspective view of one of the cam follower parts 132. As shown in FIG. 8, the cam follower part 132 has a cylindrical opening 136 which extends therethrough, and which rotatably receives a shank of the associated screw 131. The cylindrical opening 136 is concentric to a pivot axis 137 of the cam follower part 132. The cam follower part has, on one side thereof, two spaced planar surfaces 141 and 142 that are substantially co-planar, and are separated by a shallow recess 143. The surfaces 141 and 142 are slider surfaces that each slidably engage the cam 112 on the gear 101.

As discussed above in association with FIG. 4, the compression spring 92 urges the barrel member 81 downwardly in relation to the shell 17 and the gear 101. As a result, the cam follower parts 132 on the barrel member 81 are urged downwardly against the upwardly-facing cam surface 112 on the gear 101, and this in turn urges the bearing surface 103 on the gear against the bearing surface 27 on the shell 17.

FIG. 1 shows an annular protective cover 146 that is provided around the barrel member 81 just above the gear 101, in order to cover and protect the cam surface 112 and the cam follower parts 132. The lower end of the cover 146 rests on top of the gear 101, at a location just radially outwardly of the cam 111 with the cam surface 112. Although the protective cover 146 is shown in FIG. 1, for clarity it is omitted from the other drawing figures.

With reference to FIGS. 1, 2 and 3, a horizontal plate is fixedly mounted to an upper end of the barrel member 81. An anti-rotation flange 157 is fixedly secured to and extends vertically downwardly from the underside of the plate 156, at a location spaced radially outwardly from the barrel member 81. The anti-rotation flange 157 has at its lower end a horizontally outwardly projecting tab 158 that is vertically slidably received within the vertical slot 52 of the anti-rotation section 51. The cooperation of the tab 158 and slot 52 prevents rotation of the barrel member 81 relative to the shell 17.

A circuit board 161 is disposed above and supported by the plate 156. An image sensor 162 of a known type is mounted on the circuit board 161, at a location so that the vertical axis 25 extends through a central portion of the image sensor. The plate 156 has an opening 164 (FIG. 2) that is disposed just below the image sensor 162.

With reference to FIGS. 2 and 4, an optics assembly 166 is installed within the barrel member 81, near the lower end of the barrel member. The optics assembly 166 includes several optical components, such as lenses. A detailed understanding of the optics 166 is not necessary to an understanding of the present invention, and the optics 166 are therefore not described here in detail. With reference to FIG. 2, the optics 166 form on the image sensor 162 an image of a region that is disposed at the lower end of the frustoconical opening 36, and that includes the location 37 at which a specimen can be supported.

As discussed above, the microscope 10 includes eight illumination modules, three of which are identified by reference numerals 61, 62, and 63. As also discussed above, these eight illumination modules are not all identical. For example, each emits radiation with a respective different color (wavelength).

Figure 9:
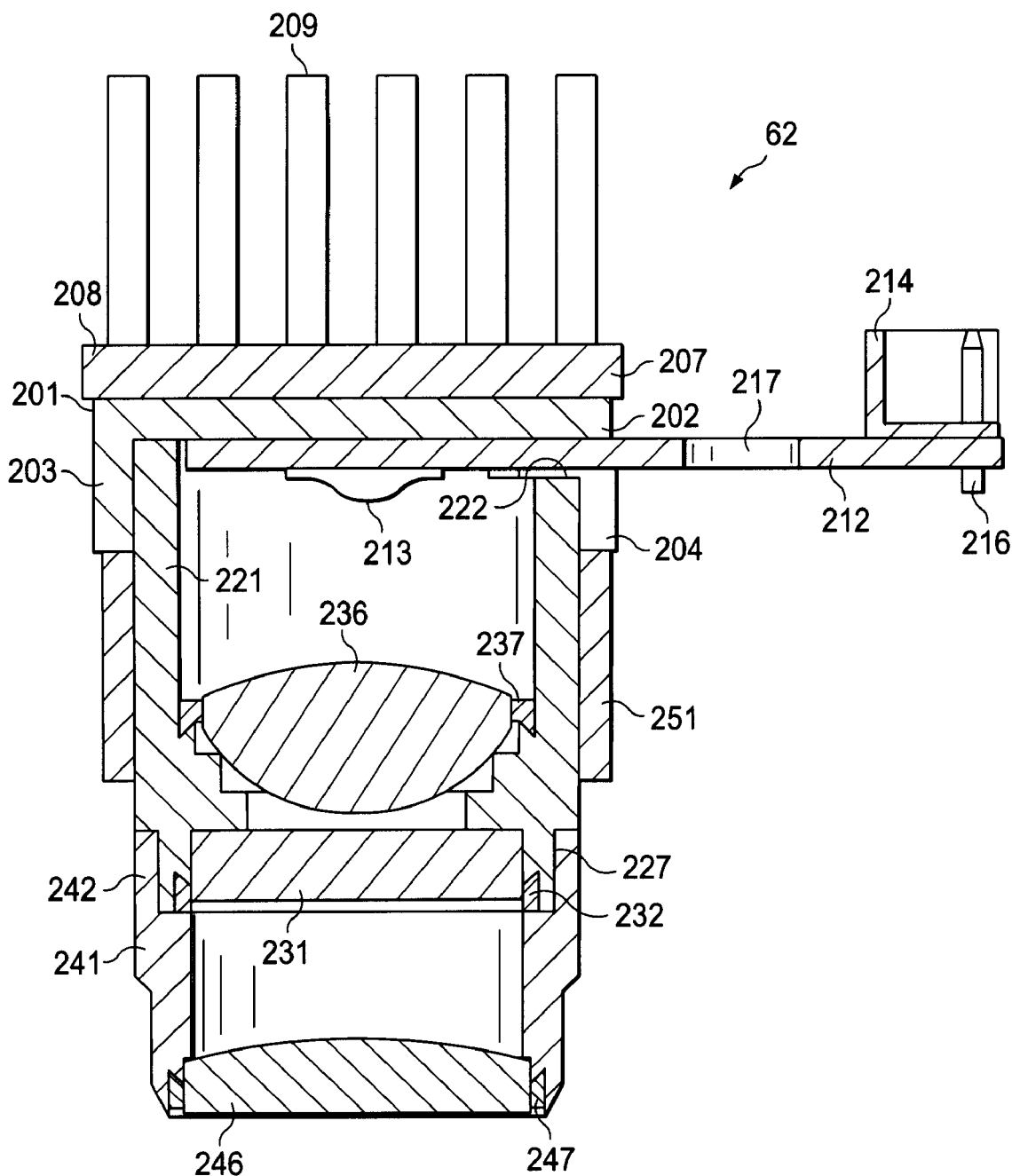
FIG. 9 is a diagrammatic central sectional side view of an illumination module that is a component of the microscope of FIG. 1.
Figure 10:
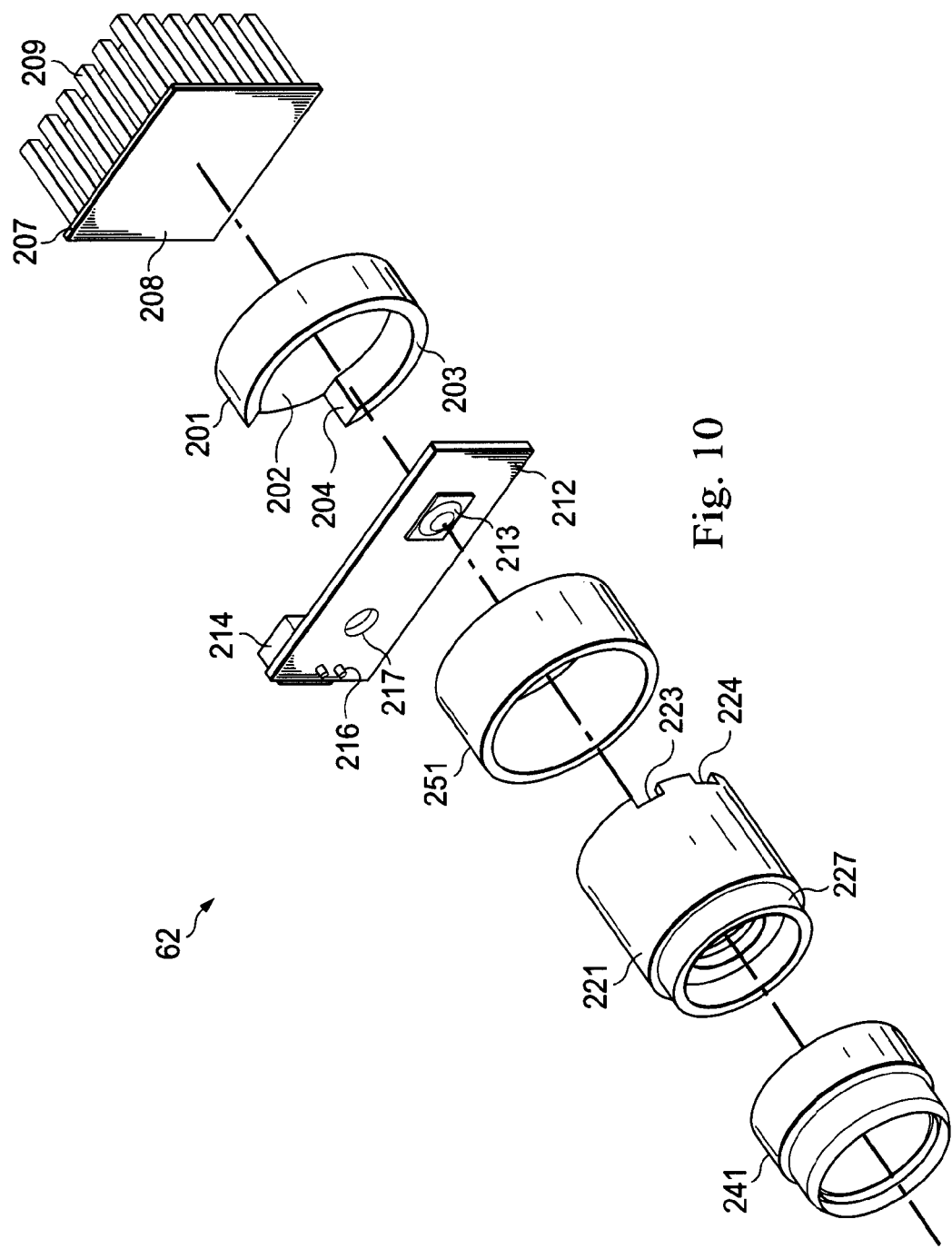
FIG. 10 is a diagrammatic perspective exploded view of the illumination module of FIG. 9.

FIG. 9 is a diagrammatic central sectional side view of the illumination module 62. FIG. 10 is a diagrammatic perspective exploded view of the illumination module 62. With reference to FIGS. 9 and 10, the illumination module 62 includes a member or cap 201 having a circular planar wall 202, and having a flange 203 that projects axially from a peripheral edge of the wall 201. A recess or gap 204 is provided through the flange 203. The member 201 is thermally conductive. In the disclosed embodiment, the member 201 is made from aluminum, but it could alternatively be made from any other suitable material.

A heat sink 207 has a base plate 208, and a plurality of spaced parallel projections 209 that extend outwardly from the base plate 208 on one side thereof. The heat sink 207 is thermally conductive. In the disclosed embodiment, the heat sink 207 is made from aluminum, but it could alternatively be made of any other suitable material. The base plate 208 of the heat sink 207 is fixedly secured to the circular wall 202 of the member 201 by a thermally-conductive adhesive that is not separately shown in the drawings. In the disclosed embodiment, the thermally-conductive adhesive is obtained commercially under the tradename TRA-BOND 2151 from TRA-CON, Inc. of Bedford, Mass. However, the heat sink 207 and member 201 could alternatively be physically and thermally coupled in any other suitable manner.

The illumination module 62 includes a small and elongate circuit board 212 with a radiation source 213 mounted on one end portion thereof, and an electrical connector 214 mounted on an opposite end portion thereof. The connector 214 and radiation source 213 are on opposite sides of the circuit board. The electrical connector 214 has two electrically conductive pins 216, and one end of each pin is soldered to a respective electrically-conductive run on the circuit board. The circuit board electrically couples the pins 216 of the connector 214 to respective terminals of the radiation source 213. In the disclosed embodiment, the radiation source 213 is a commercially-available light emitting diode (LED), and is therefore not described here in detail. The radiation source 213 in the illumination module 62 emits radiation having a center wavelength corresponding to a color commonly known as cyan. A not-illustrated cable has one end detachably coupled to the connector 214, and another end detachably coupled to a connector on another circuit board, in order to supply electrical power through the connector 214 and the circuit board 212 to the radiation source 213.

The end portion of the circuit board 212 having the radiation source 213 thereon is disposed against and fixedly secured to the circular wall 202 of the member 201. In the disclosed embodiment, this portion of the circuit board is adhesively secured to the wall 202 with the same thermally-conductive epoxy used to secure the heat sink 207 to the member 201. However, the heat sink 207, circuit board 212 and member 201 could alternatively be physically and thermally coupled in any other suitable manner. The opposite end portion of the circuit board 212 projects outwardly beyond the member 201, through the gap 204 in the flange 203. This end portion of the circuit board has a circular opening 217 therethrough adjacent the electrical connector 214. The screw 68 (FIG. 1) extends through the opening 217, in order to releasably secure the illumination module 62 to the shell 17 of the microscope 10.

With reference to FIGS. 9 and 10, the illumination module 62 includes a cylindrical tubular support 221 that has three notches 222 (FIG. 9) and 223-224 (FIG. 10) in one end thereof. In the disclosed embodiment, the support 221 is made from aluminum, but it could alternatively be made from any other suitable material. The notched end of the tubular support 221 is received within the flange 203 on the member 201, with the notch 222 aligned with the gap 204 in the flange 203. The notched end of the tubular support 221 has an outside diameter that is only slightly less than the inside diameter of the flange 203. An adhesive is provided between these two surfaces in order to fixedly secure the tubular support 221 to the member 201. In the disclosed embodiment, this adhesive is obtained commercially as LOCTITE® 380 from Henkel Corporation of Rocky Hill, Conn. However, it would alternatively be possible to couple the tubular support 221 to the member 201 in any other suitable manner.

The circuit board 212 extends outwardly through the notch 222 in the support 221. The notches 223 and 224 in the support 221 receive respective corners of the rectangular circuit board. At its outer end, the tubular support 221 has in its outer surface a circumferentially-extending annular groove 227.

An optical filter 231 of a known type is supported within the tubular support 221, near the outer end thereof. The filter 231 is held in place by a ring 232 of adhesive. In the disclosed embodiment, the adhesive includes a bond material obtained commercially under the trademark URALANE® 5753 from Huntsman Corporation of The Woodlands, Tex., with the addition of 0.4% by weight carbon lampblack to blacken and avoid fluorescence of the URALANE® bond material. Alternatively, however, the filter 231 could be held in place in any other suitable manner. The filter 231 is a bandpass filter having a center wavelength that is substantially the same as the center wavelength of the radiation emitted by the radiation source 213 (cyan).

A collimating lens 236 of a known type is provided within the tubular support 221, at a location between the filter 231 and the radiation source 213. The lens 236 is fixedly held in place by a ring 237 of the URALANE® adhesive mentioned above. However, the lens 236 could alternatively be held in place in any other suitable manner.

The illumination module 62 includes a cylindrical tubular extension 241 that is made of aluminum, but that could alternatively be made of any other suitable material. The tubular extension 241 has at one end an annular axial projection 242. The annular projection 242 is received within the annular recess 227 in the tubular support 221. The diameter of the radially-outwardly facing cylindrical surface in the recess 227 is slightly less than the diameter of the radially inwardly facing cylindrical surface on the annular projection 242. A quantity of the above-mentioned LOCTITE® 380 adhesive is provided between these two cylindrical surfaces, in order to fixedly secure the tubular extension 241 to the tubular support 221.

A focusing or condenser lens 246 of a known type is provided within the tubular extension 241, near the outer end thereof. The lens 246 is fixedly held in place by a ring 247 of the above-mentioned URALANE® 5753 adhesive. Alternatively, however, the lens 246 could be secured in place in any other suitable manner.

A cylindrical thermal barrier sleeve 251 encircles the tubular support 221, and has an inside diameter that is only slightly larger than the outside diameter of the tubular support 221. The thermal barrier sleeve 251 is fixedly secured to the tubular support 221 by a quantity of the above-mentioned LOCTITE® 380 adhesive. Alternatively, however, the sleeve 251 could be secured to the tubular support 221 in any other suitable manner. In the disclosed embodiment, the thermal barrier sleeve 251 is made of nylon. However, it could alternatively be made of any other suitable material that is thermally non-conductive, including but not limited to a plastic material.

Radiation emitted by the radiation source 213 travels downwardly in FIG. 9, and passes successively through the lens 236, the bandpass filter 231, and the lens 246. The lens 236 collimates the radiation from the source 213, the bandpass filter 231 removes wavelengths above and below the center wavelength of interest (which for the illumination module 62 is cyan), and the lens 246 takes the collimated and filtered radiation and focuses it to the specimen location 37 (FIG. 2). The filter 231 is positioned so that it is disposed in collimated radiation, with a reduced aperture. The filter 231 and the lenses 236 and 246 constitute all of the optics needed to deliver radiation from the radiation source 213 to the specimen location 37, and are all present within the removable illumination module 62. When the illumination module 62 is installed in the microscope 10, the thermal barrier sleeve 251 is disposed between the tubular support 221 and the shell 17, and resists heat flow from the illumination module to the shell. The majority of the heat emitted by the radiation source 213 flows through the member 202 to the heat sink 207, and is discharged to the ambient air disposed externally of the base 12 of the microscope.

The illumination module 62 is intentionally configured to be a very low-cost component. In this regard, the illumination module 62 uses a minimal number of optical components. Further, the filter 231 and the lenses 236 and 246 are each an inexpensive, mass-produced component that can be readily commercially obtained. For example, the lenses 236 and 246 can each be a molded plastic part. The heat sink 207 is also an inexpensive, mass-produced component that is readily commercially available. The illumination module 62 does not contain any threaded parts that screw together, and that would be relatively expensive to fabricate. Instead, the radiation source 213 and the connector 214 are each soldered to the circuit board 212, and the circuit board 212 and other components are coupled to each other through the use of appropriate low-cost adhesives, including a thermally-conductive adhesive where appropriate.

Figure 11:
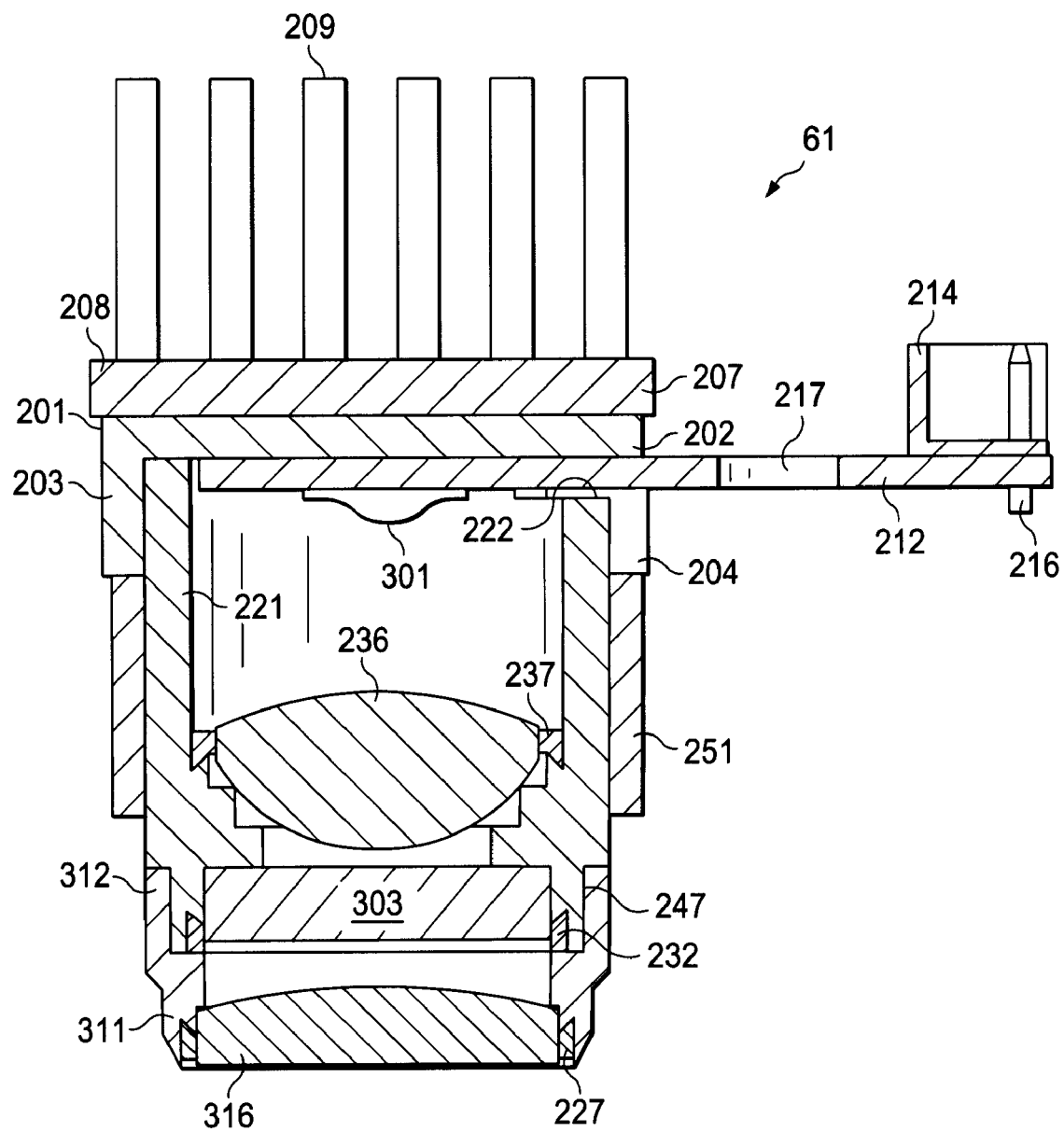
FIG. 11 is a diagrammatic central sectional side view similar to FIG. 9, but showing a different illumination module that is a component of the microscope of FIG. 1.

FIG. 11 is a diagrammatic central sectional side view similar to FIG. 9, but showing the illumination module 61 rather than the illumination module 62. The illumination module 61 is identical to the illumination module 62, except for certain differences that are discussed below. Parts in FIG. 11 that are similar or identical to parts in FIG. 9 are identified in FIG. 11 with the same reference numerals used for those parts in FIG. 9.

The illumination module 61 has on the circuit board 212 a radiation source 301. The radiation source 301 is an LED that produces radiation at a center wavelength different from the center wavelength of radiation emitted by the radiation source 213 of FIG. 9. In particular, the radiation source 301 emits radiation with a wavelength corresponding to the color red. The illumination module 61 has a bandpass filter 303 that is different from the bandpass filter 231 of FIG. 9, in that the bandpass filter 303 has a center wavelength that is the same as the center wavelength of the radiation emitted by the radiation source 301. In particular, the filter 303 has a passband with a center wavelength corresponding to the color red.

The illumination module 61 has a cylindrical tubular extension 311 that is similar to the tubular extension 241 in the embodiment of FIG. 9, except that the tubular extension 311 is axially shorter than the tubular extension 241. The tubular extension 311 has an annular axial projection 312 that engages and is adhesively secured in the annular recess 227 of the tubular support 221. The illumination module 61 has a focusing lens 316 that is fixedly mounted in the lower end of the tubular extension 311, in place of the focusing lens 246 in the embodiment of FIG. 9. The focusing lens 316 is selected to properly focus the radiation with a red wavelength that is emitted by the radiation source 301. The shorter axial length of the tubular extension 311, in comparison to the axial length of the tubular extension 241 in FIG. 9, reflects the fact that the focal length of the lens 316 is different from the focal length of the lens 246.

Figure 12:
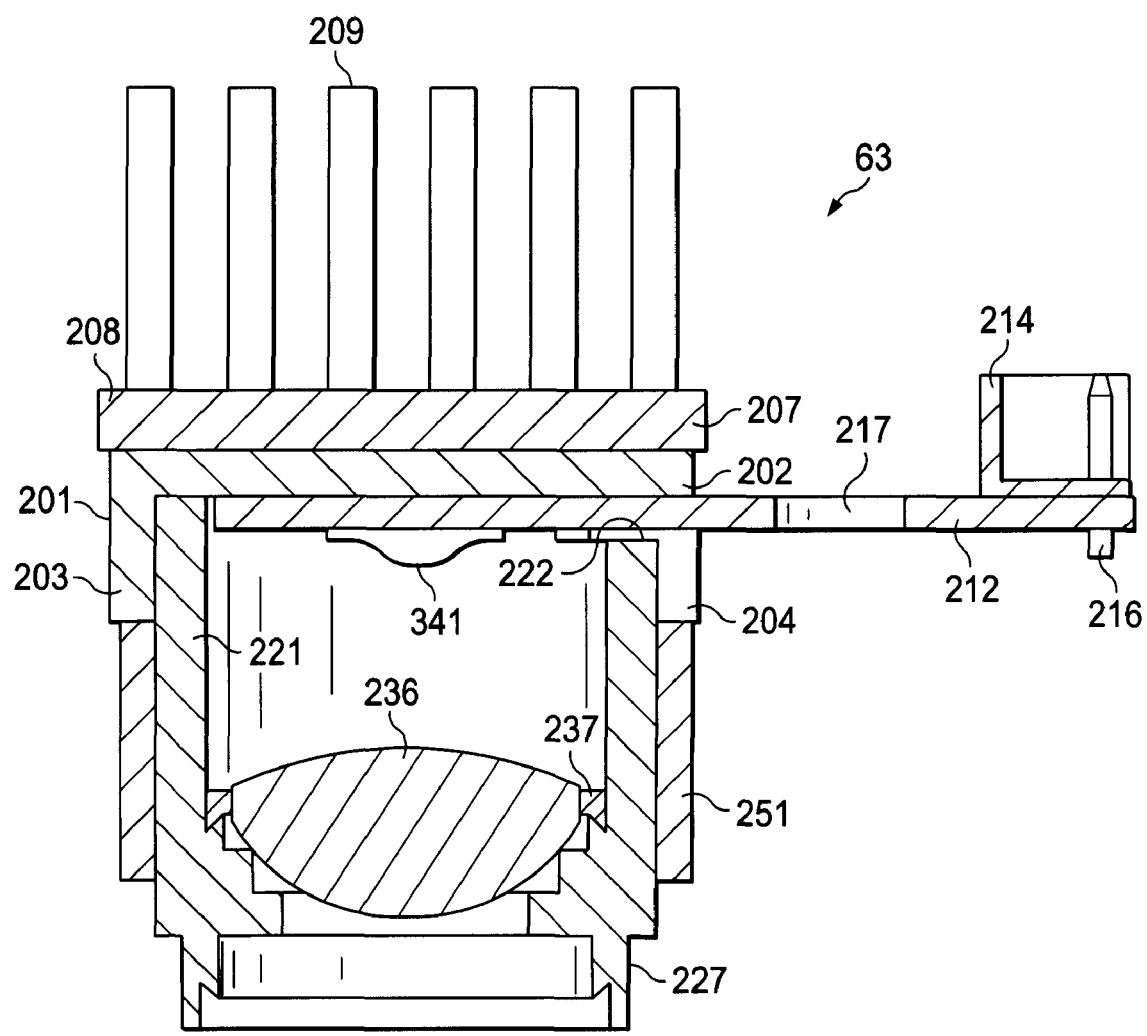
FIG. 12 is a diagrammatic central sectional side view similar to FIGS. 9 and 11, but showing yet another illumination module that is a component of the microscope of FIG. 1.

FIG. 12 is a diagrammatic central sectional side view similar to FIGS. 9 and 11, but showing the illumination module 63. The illumination module 63 is identical to the illumination 62 of FIG. 9, except for certain differences that are discussed below. The illumination module 63 does not include the filter 231, tubular extension 241, lens 246, or retaining rings 232 and 247 that are present in the illumination module 62 of FIG. 9. In addition, a radiation source 341 provided on the circuit board 212 is different from the radiation source 213 shown in FIG. 9. In particular, the radiation source 341 of FIG. 12 is an LED that emits radiation with a plurality of different wavelengths, or in other words radiation that is commonly referred to as "white light". The lens 236 collimates this white light. Since this radiation contains a variety of wavelengths, there is no need for a bandpass filter such as that shown at 231 in FIG. 9, or a focusing lens such as that shown at 246 in FIG. 9.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising a microscope that includes:
   a base;
   a barrel member supported by and axially slidable within the base for movement relative to said base along a path of travel;
   optics supported by and coaxial with said barrel member for movement therewith, and configured to image a region that includes a location for a specimen;
   a cam having a cam surface thereon, the cam being formed in one of said barrel member and said base; and
   a cam follower that is movable relative to said cam in a manner so that said cam follower slides along said cam surface in engagement therewith, said cam follower being operatively coupled to the other of said barrel member and said base, wherein in response to relative movement of said cam and said cam follower that causes said cam follower to slide along said cam surface, said cam and said cam follower effect movement of said barrel member along said path of travel relative to said base,
   wherein the base includes an annular part extending around said barrel member for rotational movement about an axis that is approximately coaxial to said path of travel, said annular part having said cam formed thereon, and said cam and said cam surface each extending circumferentially along said annular part, and
   wherein said cam follower is supported on said barrel member for pivotal movement about a pivot axis that extends approximately radially with respect to said axis of rotation of said annular part.

2. An apparatus according to claim 1, including a resilient section that yieldably urges movement of said barrel member in a first direction along said path of travel relative to said base, said cam follower being yieldably urged against said cam surface by the force applied between said base and said barrel member by said resilient section.

3. An apparatus according to claim 2, wherein said resilient section includes a compression spring that encircles said barrel member, and that has two ends respectively supported on said barrel member and said base.

4. An apparatus according to claim 1, wherein said base has an annular first bearing surface, and has an annular second bearing surface; and wherein said annular part has annular third and forth bearing surfaces that respectively slidably engage said first and second bearing surfaces to thereby facilitate said rotational support of said annular part on said base.

5. An apparatus according to claim 1, wherein said annular part has a plurality of gear teeth provided along the periphery thereof; including an electric motor supported on said base and having a rotatable shaft; and including a gear fixedly secured to said shaft and engaging said gear teeth on said annular part.

6. An apparatus according to claim 1, wherein said cam follower has two spaced surfaces that each slidably engage said cam surface.

7. An apparatus according to claim 1, including an image detector supported on said barrel member for movement therewith, said optics forming at said image detector an image of said region that includes said location.

8. An apparatus according to claim 1, wherein said microscope is a fluorescence analysis microscope.

9. An apparatus comprising a microscope that includes:
a base:
a barrel member supported by and axially slidable within the base for movement relative to said base along a path of travel;
optics supported by and coaxial with said barrel member for movement therewith, and configured to image a region that includes a location for a specimen;
a cam having a cam surface thereon, the cam being formed in one of said barrel member and said base;
a cam follower that is movable relative to said cam in a manner so that said cam follower slides along said cam surface in engagement therewith, said cam follower being operatively coupled to the other of said barrel member and said base, wherein in response to relative movement of said cam and said cam follower that causes said cam follower to slide along said cam surface, said cam and said cam follower effect movement of said barrel member along said path of travel relative to said base,
wherein said cam follower is supported by said barrel member,
wherein the base includes an annular part extending around said barrel member for rotational movement about an axis that is approximately coaxial to said path of travel, said annular part having said cam formed thereon, and said cam and said cam surface each extending circumferentially along said annular part; and
two follower parts that are supported on said barrel member at circumferentially-spaced locations for pivotal movement about respective pivot axes that each extend approximately radially with respect to said axis of rotation of said annular part, said follower parts each slidably engaging said cam surface, and said cam follower being one of said follower parts.

10. An apparatus according to claim 9, wherein each said follower part has two spaced surfaces that each slidably engage said cam surface.

11. An apparatus according to claim 9, wherein said cam is annular and extends circumferentially around barrel member, and said cam surface is an annular surface that extends circumferentially around said barrel member, said cam surface having first and second portions that are circumferentially offset with respect to each other and that have substantially identical cam profiles; and wherein when one of said follower parts is slidably engaging one of said first and second portions of said cam surface, the other of said follower parts is slidably engaging the other of said first and second portions of said cam surface.

12. A method of operating a microscope that includes a barrel member supported for axially slidable movement relative to a base along a path of travel, and that includes optics supported by and coaxial with said barrel member for imaging a region that includes a location for a specimen, said method comprising:
effecting relative movement of a cam formed in one of said barrel member and said base with respect to a cam follower operatively coupled to the other of said barrel member and said base in a manner so that said cam follower slides along a cam surface on said cam;
responding to said sliding movement of said cam follower along said cam surface by effecting relative movement of said cam and cam follower in a manner that in turn effects axial movement of said barrel member along said path of travel relative to said base;
supporting said cam follower by said barrel member; and
supporting an annular part on said base for rotational movement about an axis that is approximately parallel to said path of travel, said annular part extending around said barrel member and having said cam formed thereon, and said cam and said cam surface each extending circumferentially along said annular part.

13. A method according to claim 12, including resiliently urging movement of said barrel member in a first direction along said path of travel relative to said base, said cam follower being yieldably urged against said cam surface by the resilient force applied between said base and said barrel member.

14. A method according to claim 12, including supporting said cam follower on said barrel member for pivotal movement about a pivot axis that extends approximately radially with respect to said axis of rotation of said annular part.

15. A method according to claim 12, including supporting two follower parts on said barrel member at circumferentially-spaced locations for pivotal movement about respective pivot axes that each extend approximately radially with respect to said axis of rotation of said annular part, said follower parts each slidably engaging said cam surface, and said cam follower being one of said follower parts.

* * * * *

UNITED STATES PATENT AND TRADEMARK OFFICE
CERTIFICATE OF CORRECTION

PATENT NO. : 8,363,317 B2
APPLICATION NO. : 12/490082
DATED : January 29, 2013
INVENTOR(S) : Peter A. Rozitis et al.

It is certified that error appears in the above-identified patent and that said Letters Patent is hereby corrected as shown below:

In the Claims:

In claim 9, column 9, line 25, "base:" should be replaced with --base;--.

Signed and Sealed this
Seventh Day of May, 2013

Teresa Stanek Rea
*Acting Director of the United States Patent and Trademark Office*